United States Patent
Cook et al.

(10) Patent No.: US 8,411,082 B1
(45) Date of Patent: Apr. 2, 2013

(54) STREAMED RAY TRACING SYSTEM AND METHOD

(75) Inventors: Robert L. Cook, San Anselmo, CA (US); Thomas Douglas Selkirk Duff, Berkeley, CA (US); Brian Smits, Corvallis, OR (US)

(73) Assignee: Pixar, Emeryville, CA (US)

( * ) Notice: Subject to any disclaimer, the term of this patent is extended or adjusted under 35 U.S.C. 154(b) by 279 days.

(21) Appl. No.: 12/860,702

(22) Filed: Aug. 20, 2010

Related U.S. Application Data (60) Provisional application No. 61/235,899, filed on Aug. 21, 2009.

(51) Int. Cl.
*G06T 15/00* (2006.01)
*G06T 17/00* (2006.01)
*G06T 15/40* (2006.01)

(52) U.S. Cl. .................. 345/419; 345/420; 345/421

(58) Field of Classification Search .................. 345/419
See application file for complete search history.

(56) References Cited

PUBLICATIONS

Timothy L. Kay and James T. Kajiya. 1986. Ray tracing complex scenes. In Proceedings of the 13th annual conference on Computer graphics and interactive techniques (SIGGRAPH '86), David C. Evans and Russell J. Athay (Eds.). ACM, New York, NY, USA, 269-278.*
Agelet et al., Agelet, F.A.; Fontan, F.P.; Formella, A.; , "Fast ray tracing for microcellular and indoor environments," Magnetics, IEEE Transactions on , vol. 33, No. 2, pp. 1484-1487, Mar. 1997.*
MacDonald, J.D., Booth, K.S.: Heuristics for ray tracing using space subdivision. Vis.Comput. 6, 153-166 (1990).*
Parker et al., Steven Parker, Michael Parker, Yarden Livnat, Peter-Pike Sloan, Charles Hansen, and Peter Shirley. 2005. Interactive ray tracing for volume visualization. In ACM SIGGRAPH 2005 Courses (SIGGRAPH '05), John Fujii (Ed.). ACM, New York, NY, USA, Article 15.*
Nakamaru et al., Breadth-First Ray Tracing Utilizing Uniform Spatial Subdivision, IEEE Transactions on Visualization and Computer Graphics, Oct.-Dec. 1997, pp. 316-328, vol. 3, No. 4.

* cited by examiner

*Primary Examiner* — Ulka Chauhan
*Assistant Examiner* — Sae Won Yoon
(74) *Attorney, Agent, or Firm* — Kilpatrick Townsend & Stockton LLP (57) ABSTRACT

An ordered object list is compared with an ordered ray list and if the coordinate value of an entry in the ray list is less than the coordinate value of an entry in the object list, then the ray is added to an active ray list, and a trace of that ray is made against all objects in an active object list. If the coordinate value of the entry in the ray list is greater than the coordinate value of the entry in the object list, then the coordinate value corresponding to the entry in the object list is added to an active object list, and a trace of all rays in the active ray list is made against that coordinate value. Rays and objects are removed from the active lists based on determinations as to whether a trace hit occurred and/or which object point is encountered.

19 Claims, 6 Drawing Sheets

|       | Ray List | Object List |
|-------|----------|-------------|
|       | 200t     | Emin        |
|       | 200e     | Cmin        |
|       |          | Fmin        |
|       |          | Emax        |
|       |          | Fmax        |
|       |          | Cmax        |
|       |          | Dmin        |
|       |          | Dmax        |
|       |          | Amin        |
|       |          | Amax        |
|       |          | Bmin        |
| 5a)   |          | Bmax        |

5b)  | 200t |   |  | 5i) |      | Cmin |
5c)  | 200+ | Emin | | 5j) |      | Cmin / Cmax |
5d)  | 200+ | Emin / Cmin | | 5k) |      | Dmin |
5e)  | 200+ | Emin / Cmin / Fmin | | 5l) | 200e | Dmin |
5f)  | 200+ | Emin / Cmin / Fmin / Emax | | 5m) | 200e | Dmin / Dmax |
5g)  | 200+ | Cmin / Fmin | | 5n) | 200e |   |
5h)  | 200+ | Cmin / Fmin / Emin | | 5o) | 200e | Amin |
     |      |         | | 5p) | 200e | Amin / Amax |

STREAMED RAY TRACING SYSTEM AND METHOD

CROSS-REFERENCES TO RELATED APPLICATIONS

This Application claims the benefit of and priority to U.S. Provisional Patent Application No. 61/235,899, filed Aug. 21, 2009 and entitled "STREAMED RAY TRACING SYSTEM AND METHOD" which is hereby incorporated by reference for all purposes.

BACKGROUND

The present invention relates in general to computer animation techniques. More particularly, embodiments the present invention relate to a system and a method for efficiently rendering objects with ray tracing where the objects are geometrically grouped and the rays are geometrically grouped according to directions of travel of the rays.

Throughout the years, movie makers have often tried to tell stories involving make-believe creatures, far away places, and fantastic things. To do so, they have often relied on animation techniques to bring the make-believe to "life." Two of the major paths in animation have traditionally included drawing-based animation techniques and stop motion animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw or paint animated images onto transparent media or cels. After painting, each cel would then be captured or recorded onto film as one or more frames in a movie.

Stop motion-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Stop motion animation techniques were developed by movie makers such as Willis O'Brien for movies such as "King Kong" (1933). Subsequently, these techniques were refined by animators such as Ray Harryhausen for movies including "Mighty Joe Young" (1948) and "Clash Of The Titans" (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment stop motion animation techniques. For example, physical models could be represented by virtual models in computer memory, and manipulated.

One of the pioneering companies in the computer graphics (CG) industry was Pixar. Pixar developed both computing platforms specially designed for CG, and rendering software now known as RENDERMAN®. RENDERMAN® was particularly well received in the CG industry and was recognized with two Academy Awards®. RENDERMAN® software is used to convert graphical specifications of objects and convert them into one or more images. This technique is known generally in the industry as rendering.

One CG technique used for image rendering (or rendering) is ray tracing. Ray tracing is an image rendering technique where computerized rays (or rays) are projected from a "camera" (i.e., the viewpoint of an imaginary viewer) through pixels in the image plane and outward toward a computerized scene (or scene). Ray tracing contrasts with other inefficient image rendering techniques, such as where rays might be traced from a light source to a scene and then to the camera. Tracing rays from the camera outward provides orders of magnitude higher computing efficiency in rendering a scene as compared to tracing rays from a light source to the camera as many rays that originate at a light source either do not reach the camera or do not significantly contribute to a rendered image of a scene.

According to traditional ray tracing techniques, a determination is made for each ray whether the ray intersects a computerized object (or object) in a scene. As referred to herein a scene may include one or more objects, which may be computerized light sources (or light sources) or objects with which light interacts. If a ray does not intersect an object, the pixel associated with the ray may be shaded according to a background color or the like.

More specifically, when rendering an object for a scene using ray tracing, primary rays are traced and a determination is made whether the rays intersect an object. The primary rays are used to determine the portions of the object that are visible or in shadow. If a point on an object is visible, the point is shaded to indicate its visibility, and if a point is in shadow, the point is alternatively shaded to indicate shadow. Secondary rays, tertiary rays, etc., which are respectively associated with the primary rays, are then traced to determine reflection from the object, shadow, ambient occlusion, refraction through the object, color of the object, and/or the like.

One disadvantage associated with traditional ray tracing is that objects are be accessed in memory in an arbitrary order because each secondary ray could potentially hit any object anywhere in a scene. A relatively simplistic ray tracing scheme typically considers "n" number of objects for each primary ray, secondary ray, tertiary ray, etc. To consider n objects in a ray tracing scheme, the objects are accessed from memory in an arbitrary order as discussed above, which results in relatively slow processing. Processing acceleration schemes have been developed to help with this memory access problem, such as storing the objects in a three dimensional tree structure according to the bounding boxes of the objects. While this technique accelerates the determination of the objects that are considered for a ray intersection test, it is still necessary to retrieve these objects from memory. Because memory access is not performed in a coherent order, each object in a scene usually is read in from memory in an inefficient manner. If the number of objects in a scene is relatively large, this can be very expensive in term of processing time and hence monetary expense.

As can therefore be understood from the foregoing description, traditional ray tracing techniques have limited ability to efficiently render an image. Therefore, it is highly desirable to provide more efficient techniques for ray tracing.

BRIEF SUMMARY

The present disclosure in general provides computer animation and rendering systems and computer animation and rendering methods. More particularly, various embodiments provide a computerized system and a computerized method for efficiently rendering objects with ray tracing where the objects and the rays are grouped and ordered according to predetermined directions of travel of the rays.

According to one embodiment, a computer implemented ray tracing method for use in rendering an image in a scene, which includes a plurality of rays and a plurality of objects, is provided. The method is implemented in a computer system and typically includes for each object, determining a minimum coordinate value and a maximum coordinate value along a primary direction, and ordering the minimum and maximum coordinate values of the objects to form an ordered object list. The method also typically includes determining coordinate values for the rays along the primary direction, ordering the coordinate values of the rays to form an ordered ray list, and performing a ray tracing operation based on the order of the rays and objects in the ordered object list and the ordered ray list. The method further typically includes rendering the image using the results of the ray tracing operation. In certain aspects, determining minimum and maximum coordinate values for the objects includes forming a bounding structure around each object and determining the minimum and maximum values of each bounding structure along the primary direction. In certain aspects, bounding structure includes a structure having at least one face that is perpendicular to the primary direction.

In certain aspects, performing a ray tracing operation includes a) comparing the first entry in the ordered object list with the first entry in the ordered ray list, and b) if the coordinate value of the first entry in the ordered ray list is less than the coordinate value of the first entry in the ordered object list, then adding the ray corresponding to the first entry in the ordered ray list to an active ray list, and tracing that ray against all objects in an active object list, and c) if the coordinate value of the first entry in the ordered ray list is greater than the coordinate value of the first entry in the ordered object list, then adding the object coordinate value corresponding to the first entry in the ordered object list to an active object list, and tracing all rays in the active ray list against that object coordinate value.

According to another embodiment, the method further includes repeating the ordering step for each primary direction in a coordinate system. The primary directions include a +x primary direction, a −x primary direction, a +y primary direction, a −y primary direction, a +z primary direction, and a −z primary direction in certain aspects. The coordinate system is an orthogonal coordinate system or a tetrahedral coordinate system in certain aspects. The primary directions for a tetrahedral coordinate system may be orthogonal to the surfaces of a tetrahedron.

According to another embodiment, the method further includes ordering the rays in the ray set in a ranked order based on increasing values of origins of the rays along the primary direction. A highest ranking ray in the ray set has a lowest origin value along the primary direction and a lowest ranking ray in the ray set has a highest origin value along the primary direction.

According to another embodiment the method further includes rendering an image of the objects based on the shading steps and rendering an animation of the objects based on the shading steps. The rays may be primary rays or secondary rays.

According to one embodiment of the present invention, a computer program product for the foregoing described computerized method is storable on a computer readable medium and includes code that may be run on a computer for executing the computerized method. According to another embodiment, a computer system is configured to store the computer program product in a memory, and includes a bus configured to transfer the code to a processor that is configured to execute the code to render an image of a scene according to the described computerized ray tracing method.

Advantageously the objects need only be grouped and ordered once per image frame, and an ordered object list for a primary direction may be reversed when traversing the opposite direction.

According to another embodiment, a tangible computer readable medium is provided that stores code, which when executed by a processor, causes the processor to determine a minimum coordinate value and a maximum coordinate value along a primary direction for each of a plurality of objects for an image to be rendered, and to order the minimum and maximum coordinate values of the objects to form an ordered object list. The code also causes the processor to determine coordinate values for each of a plurality of rays along the primary direction, to order the coordinate values of the rays to form an ordered ray list, and to perform a ray tracing operation based on the order of the rays and objects in the ordered object list and the ordered ray list. The code further typically causes the processor to render the image using the results of the ray tracing operation, or to send data to an image rendering device or system for rendering of the image.

A better understanding of the nature and advantages of the present invention may be gained with reference to the following detailed description and the accompanying drawings.

BRIEF DESCRIPTION OF THE DRAWINGS

FIG. 2 is a simplified schematic of a ray tracing environment according to one embodiment; FIG. 2b shows the relevant coordinate values along the x-axis 9 primary direction) for the objects and select rays of FIG. 2a.

FIG. 5 shows an example of active lists for various times during implementation of the method of FIG. 3 with the objects and select rays from FIG. 2a.

DETAILED DESCRIPTION

Various embodiments in general provides computer systems and computer implemented methods for rendering images. More particularly, embodiments provide computer systems and computer implemented methods for efficiently rendering objects with ray tracing where the objects and the rays are grouped according to predetermined directions of travel of the rays. Merely by way of example, embodiments are described as applied to a ray tracing process, but it should be recognized that the invention has a broader range of applicability.

Figure 1:
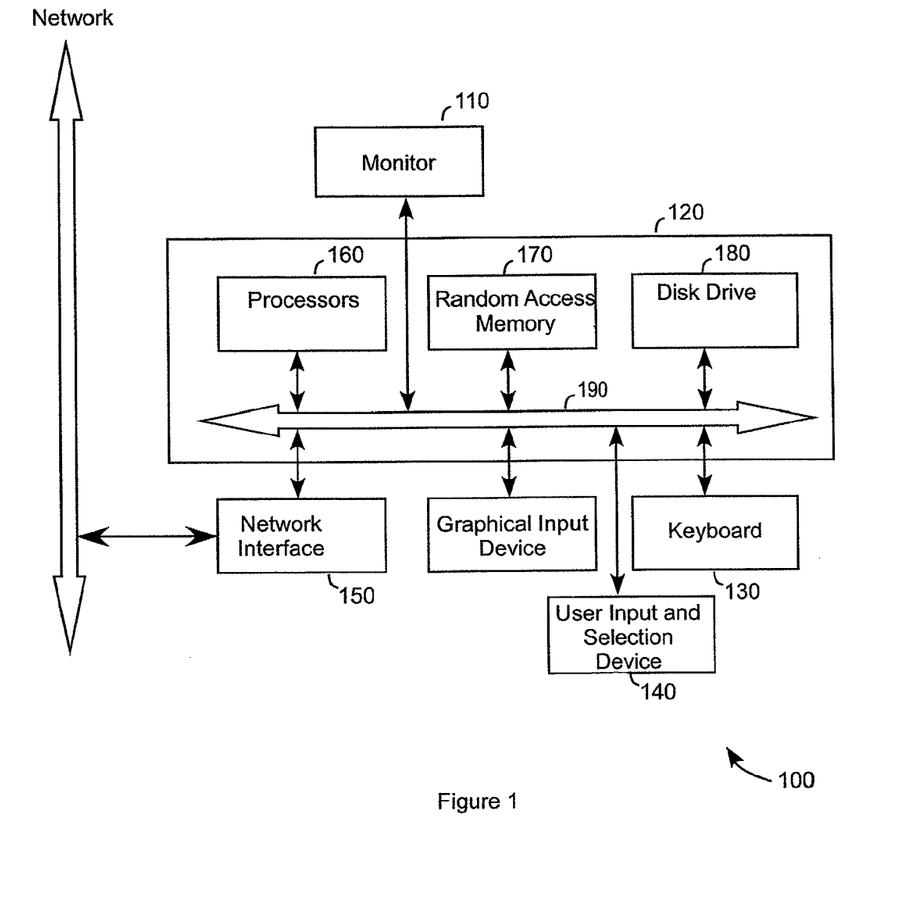
FIG. 1 is a block diagram of an image rendering system according to one embodiment.

FIG. 1 is a simplified block diagram of an image-rendering system 100 according to one embodiment. Image-rendering system 100 may be configured to execute various steps of ray tracing embodiments of the present invention discussed below in detail. The block diagram of image-rendering system 100 is exemplary and therefore should not unduly limit the scope of the claims. One of ordinary skill in the art would recognize variations, alternatives, and modifications for image-rendering system 100 for rending images according to the computerized rendering embodiments described herein. According to one embodiment, image-rendering system 100 includes a monitor 110, a computer 120, a keyboard 130, a user input device 140, and a network interface 150.

User input device 140 may be a computer mouse, a trackball, a track pad, wireless remote, and/or the like. The user input device 140 allows a user to select objects, icons, text and the like that are displayed on monitor 110.

Network interface 150 may include one or more of an Ethernet card, a modem (telephone, satellite, cable, ISDN), (asynchronous) digital subscriber line (DSL) unit, and/or the like. Network interface 150 is typically coupled to a computer network as shown. In other embodiments, network interface 150 may be physically integrated on the motherboard of computer 120, may be a software program, such as soft DSL, or the like.

Computer 120 includes computer components, such as a processor 160, a memory 170, such as a random access memory (RAM) 170, a disk drive 180, and a system bus 190 interconnecting these components. According to a specific embodiment, computer 120 is a PC compatible computer having multiple microprocessors such as Xeon™ microprocessor from Intel Corporation. Computer 120 might include an operating system such as UNIX. While computer 120 is described generally as an integrated computer, computer 120 may be a distributed computer comprising a plurality of computing systems, which are networked together via a network (such as a LAN, a WAN, the Internet or the like), where various computers of the computing system may configured to execute various methods steps described herein. For example, computer 120 may include a server (which may be composed of a plurality of computers and computer systems) and a user computer (which may be a workstation, a personal computer or the like).

RAM 170 and disk drive 180 are examples of tangible media for storage of data, audio files, video files, embodiments of the herein described invention including computer programs configured to execute the steps of methods described herein, scene descriptors, object data files, shader, shader descriptors, a rendering engine, output image files, texture maps, displacement maps, object pose data files, and the like. Other types of tangible media that may be included in image-rendering system 100 include floppy disks, removable hard disks, optical storage media, such as CD-ROMs and bar codes, semiconductor memories, such as flash memories, read-only-memories (ROMs), battery-backed volatile memories, networked storage devices, and/or the like.

Image-rendering system 100 may also include software that enables communications over a network, such as a network using the HTTP, TCP/IP, RTP/RTSP protocols, and the like. In alternative embodiments of the present invention, other communications software and transfer protocols may also be used, such as IPX, UDP or the like.

As discussed above and further emphasized here, FIG. 1 is representative of an image-rendering system embodiment. It will be readily apparent to one of ordinary skill in the art that many other hardware and software configurations are suitable for use with various embodiments. For example, the use of other microprocessors is contemplated, such as Pentium™ or Itanium™ microprocessors; Opteron™ or AthlonXP™ microprocessors from Advanced Micro Devices, Inc; PowerPC G3™ or G4™ microprocessors from Motorola, Inc.; and the like. Further, other types of operating systems are contemplated, such as Windows® operating system, such as WindowsXP®, WindowsNT®, or the like from Microsoft Corporation, Solaris from Sun Microsystems, LINUX, UNIX, MAC OS from Apple Computer Corporation, and the like. Alternatively, embodiment of the present invention might include dedicated graphics processing units (GPUs) or special-purpose ray tracing hardware and/or software implemented with very large scale integrated (VLSI) chips or application-specific integrated circuits (ASICs).

Ray tracing, generally described, is an image rendering technique where computerized rays are projected in a computerized scene, which may include a set of virtual objects. When rendering an image using ray tracing, "primary" rays are first traced to determine the portions of an object that are visible in a scene. A point is visible in a scene if a traced ray travels unimpeded by other objects from a camera to a point on an object. If a point on an object is visible it is shaded (e.g., white) to indicate its visibility or otherwise shaded (e.g., black, gray, background color, etc.) to indicate non-visibility (e.g., occluded by another object or the like). For each primary ray that is projected for a visible point on an object, a secondary ray, a tertiary ray, etc. may then be projected to determine the color for the visible point. Secondary and higher order rays are projected to determine reflections from the object, shadow, ambient occlusion, refraction through the object, color, and/or the like.

Figure 2A:
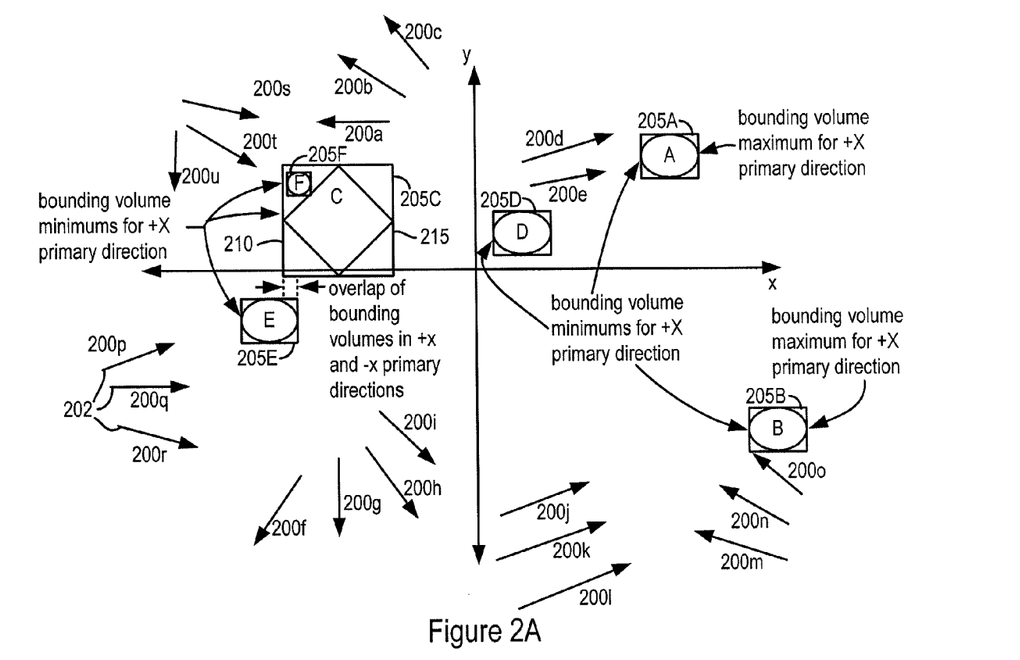
FIG. 2a shows various rays and objects.

FIG. 2a is a simplified schematic of a ray tracing environment according to one embodiment. The environment may be the virtual environment of image-rendering system 100. The ray tracing environment includes a plurality of rays 200, such as primary rays, secondary rays, tertiary rays, etc. Each ray has an origin 202. The origins of rays 200p, 200q, and 200r are identified. The origins of the other rays are not labeled to limit clutter in FIG. 2a. Each ray, as shown in FIG. 2a, has a direction in which the ray travels. The direction of travel of the ray is indicated by the direction vector representing the ray. According to one embodiment of the present invention, rays may travel in three dimensions in a virtual scene that makes up the image. That is, the program code that tracks and calculates the direction of travel of the rays is configured to provide for travel of the rays in three dimensions.

The units for the components of the direction vectors may be arbitrary distance units or dimensionless parameters that indicate distance. Image-rendering system 100 may be configured to store on the computer system a direction vector for each ray.

Figure 2B:
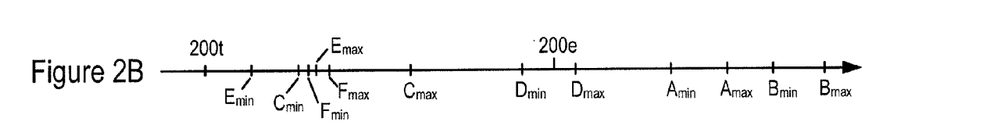
Figure 2C:
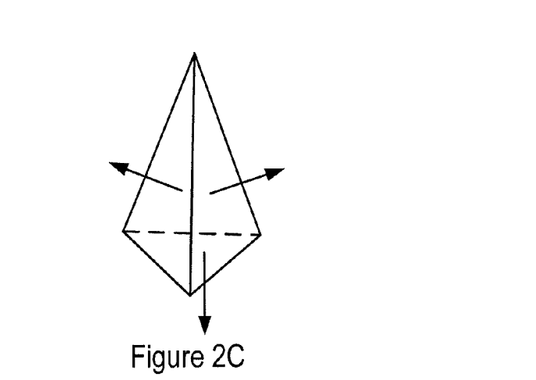
FIG. 2c is a simplified planar view of a tetrahedral coordinate system with eight primary directions, which might be defined as orthogonally outward from the four faces of a tetrahedron.

According to one embodiment, image-rendering system 100 is configured to group rays according to "primary" directions of travel of the rays. For a coordinate system according to one embodiment of the present invention, the primary directions of travel may be +x (positive x-direction), −x (negative x-direction), +y (positive y-direction), −y (negative y-direction), +z (positive z-direction), and −z (negative z-direction). For the +x primary direction, coordinate values may increase from left to right. For the −x primary direction, coordinate values may increase from right to left. For the +y primary direction, coordinate values increase from bottom to top. For the −y primary direction, coordinate values increase from top to bottom. For the +z primary direction, the coordinate values may increase back to front with respect to the plane of the page for FIG. 2a. For the −z primary direction, the coordinate values may increase from front to back with respect to the plane of the page for FIG. 2a. The coordinate system described above is similar to the Cartesian coordinate system in the +x, +y, and +z primary directions having increasing values similar to the Cartesian coordinate system, but the −x, −y, and −z primary directions having increasing values opposite that of the Cartesian coordinate system. It is noted that this choice of coordinate system is arbitrary, but provides for a simplified description of the embodiments discussed herein. The Cartesian coordinate system or other coordinate system may be used. For example, the primary directions of travel may be associated with the faces of a tetrahedron. FIG. 2c is a simplified planar view of a tetrahedral coordinate system with four primary directions, which might be defined as orthogonally outward from the four faces of a tetrahedron 300. These four primary directions may be labeled with an arbitrary labeling system as will be understood by those of skill in the art. According to another example, a coordinate system configured for use with the embodiments described herein might have any number, e.g., 8, 16, 32 or more, directions of travel.

The primary direction of travel for any given ray might be calculated from the direction vector for the given ray. To determine direction of a ray, in one embodiment, the dot product of the ray with the origin (unit vector) along the principal or primary direction is taken. For the sake of simplicity, the primary direction of travel of a ray will be along the coordinate axes (e.g., +x. −x, +y, −y, +z, and −z) for the purposes of this discussion.

Referring again to FIG. 2a, the ray tracing environment includes a plurality of objects A, B, C, D, E, and F, with which the rays might intersect. Each object may be enclosed by a bounding volume 205. Bounding volumes may be right shapes, which are shapes where the sides meet at right angles (e.g., a rectangular box), or other shapes, such as paralellapipeds, rounded shapes, capricious shapes or the like. Bounding volumes may have sides that are perpendicular to the primary axes. That is, two sides of each bounding volume are perpendicular to one of the primary axes. Each bounding volume has a minimum or closest side and a maximum or farthest side with respect to a primary direction. The minimum or closest side has a smallest value along a primary direction and the maximum or farthest side has a largest value along the primary direction. For example, the bounding volume around object C has a side 210 (perpendicular to the x axis), which is said to be the closest side with respect to the +x primary direction, and object C has a side 215 (perpendicular to the x axis), which is said to be the farthest side with respect to the +x primary direct. Further, side 215 is said to be the closest side with respect to the −x primary direction and side 210 is said to be the farthest side with respect to the −x primary direction. The sides of the bounding volume for object C that are perpendicular to the y and z axes may be similarly referred to. While the bounding volumes have been described as right shapes, the bounding volumes may have other shapes and may have minimum points and maximum points with respect to the primary axis where a minimum point has a smallest value for the bounding volume along a primary direction and a maximum point for the bounding volume has a largest value along a primary direction.

According to one embodiment of the present invention, the objects are sorted into an object set for each of the primary directions. The closest or minimum sides or points and farthest or maximum sides or points are sorted in the order in which they might be encountered along the primary direction. Each object set may include an identifier for an object (e.g., "A"), and coordinate information for the minimum and maximum side or point of the bounding box for each object. For example, for the objects shown in FIG. 2a, the objects may be ranked or sorted in a +x object set as: (E min, C min, F min, E max, F max, C max, D min, D max, A min, A max, B min, B max) based on the x coordinate value of the bounding box edges as shown FIG. 2b. For the −x direction, the −x object set would look like: (B min, B max, A min, A max, D min, D max, C min, F min, E min, F max, C max, E max). However, one can see that because B min along the −x direction has the same coordinate value as B max along the +x direction, and B max along the −x direction has the same coordinate value as B min along the +x direction, that only a single object set for the x axis need be made. In this manner, the single sorted list (e.g., from the perspective of the +x direction) may be reversed when considering the opposite direction (e.g., −x direction). Similarly, the objects may be sorted in the +y object set as (B min, B max, E min, E max, C min, D min, D max, F min, A min, F max, C max, A max). For convenience, the coordinate information for each minimum side or point is not shown in the object sets. The +z, and −z objects sets may be similarly ordered.

An object set may include other geometric (e.g., surface shape), optical (e.g., reflectance, transmission, refraction, surface roughness, etc.), etc. information for the objects. The geometric, optical, etc. information may be retrieved from memory during image rendering of the scene that includes the objects. It is noted that the geometric, optical, etc. information for the objects may be stored in memory based on the order of the objects in the objects sets.

In one embodiment, the rays are also sorted into ray sets as described above based on the primary directions of the rays. For the example of FIG. 2a, a +x ray set may include rays ranked in the following order (200p, 200q, 200r, 200s, 200t, 200j, 200k, 200d, 200e, 200l,). A −x ray set may include rays ranked in the following order (200o, 200n, 200m, 200c, 200b, 200a). The +y, −y, +z, and −z ray sets may be similarly ordered. The image rendering system may be configured to create the ray sets.

Figure 3:
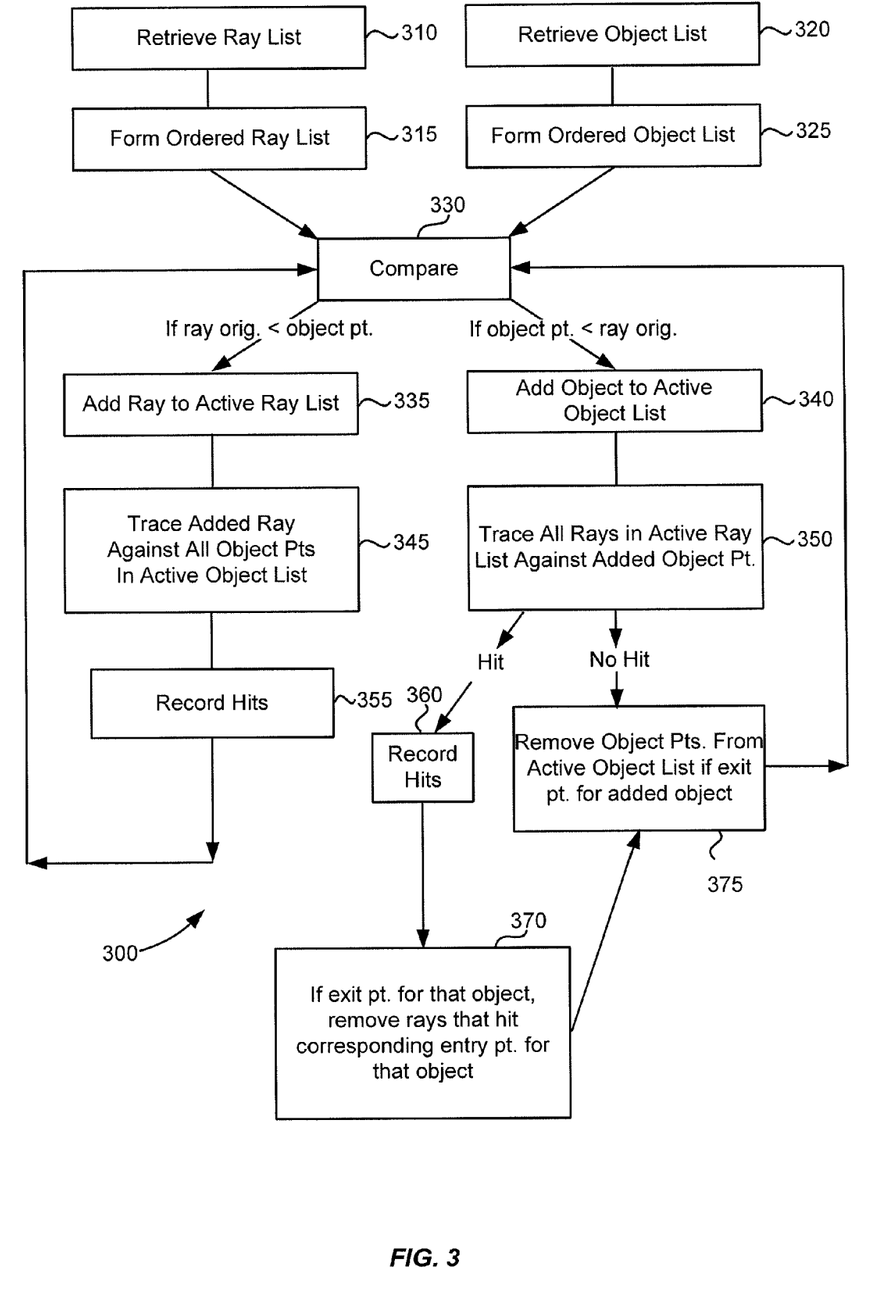
FIG. 3 is a flow chart for an image rendering method according to one embodiment.

FIG. 3 illustrates a method 300, according to one image rendering embodiment, for rendering an image of a scene. In step 310, a list of rays (e.g., secondary rays or tertiary rays) is retrieved from memory; this list typically includes data about the rays such as the origin and the direction of the ray. In step 315, the rays are sorted by origin along a primary direction in the order in which they would be encountered along that direction (e.g., along the +x direction) to form an ordered ray list. This step may include taking the dot product of the origin with the principal or primary direction. The sorted list includes, for each ray, the origin and the direction. In step 320, a list of objects (e.g., primitives) in the image/scene is retrieved from memory. In step 325, an object set for each primary direction is formed and the objects are sorted (e.g., using bounding boxes: a bounding volume is formed around each object in a set of objects; each bounding volume includes a bounding volume minimum and a bounding volume maximum along a primary direction) within each set as discussed above. For each object list, each object is listed twice, once for the closest point and once for the farthest point as discussed above.

Figure 4:
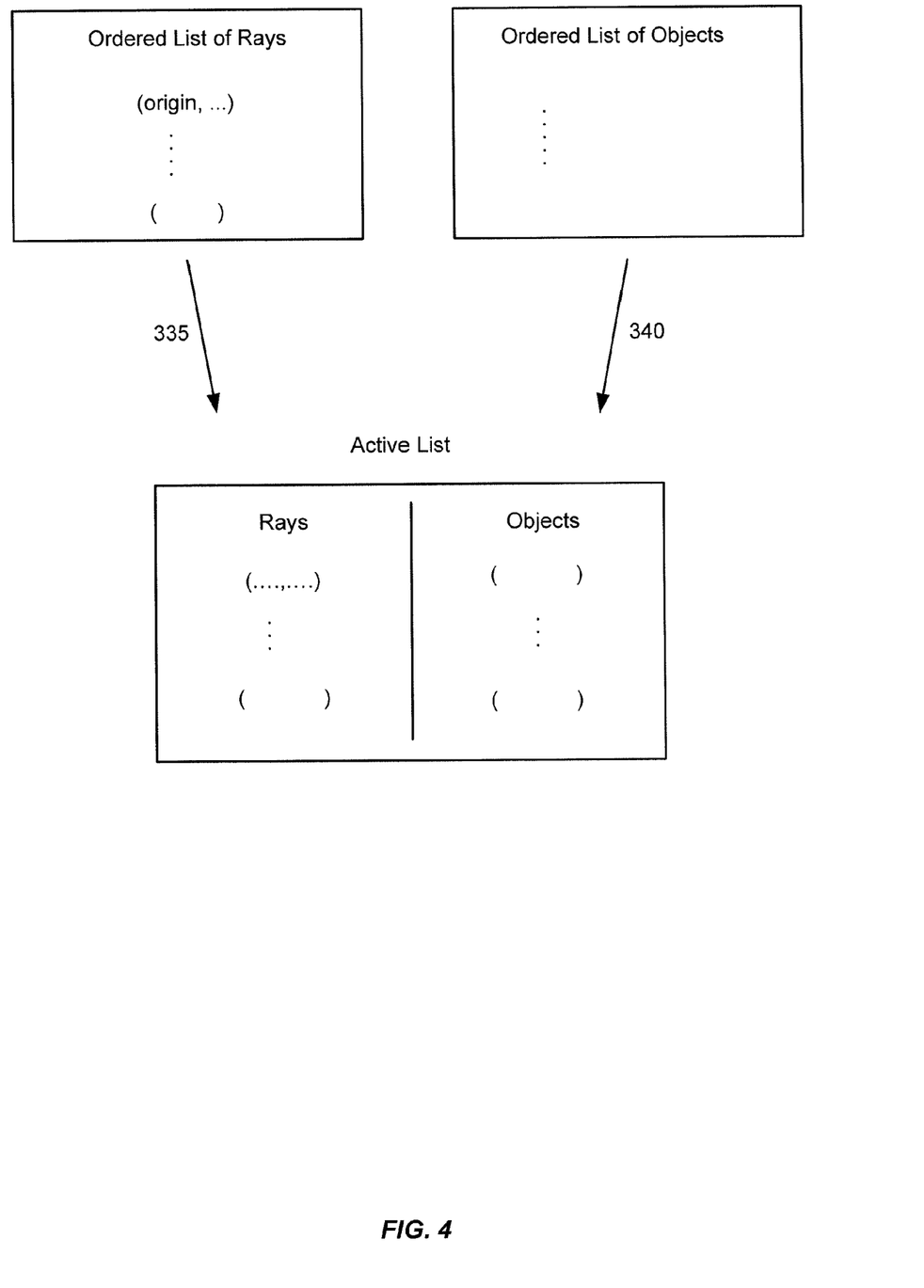
FIG. 4 shows an ordered list of rays and an ordered list of objects and active lists for objects and rays.

In step 330, for a primary direction, the first ray in the sorted ray list is compared with the first object in the sorted object list. If the ray is closer than the first object point in the list, then that ray is added to an active ray list (meaning that this is a new ray) in step 335 and is removed from further consideration when step 330 repeats. That is, if the origin of the first ray along the given primary direction is less than the coordinate along the primary direction for an object bounding box point, that ray is added to the active ray list and effectively removed from further consideration from the ordered ray list during step 330. The active ray list is initially empty. If, however, an object point in the list is closer than the ray, the object point is added to an active object list in step 340. FIG. 4 shows and example of rays and object points being added to an active list from an ordered ray list and an ordered object list. The active list may include two separate lists or data structures, one for the rays and one for the object points, or the list may include a single data structure.

Returning to FIG. 3, once a ray is added to the active ray list, that ray is traced against all objects in the active object list (also initially empty) in step 345. If there is a trace hit (e.g., intersection of ray projected on object), it is recorded in step 355. Step 330 then repeats. When an object point is added to the active object list, all rays in the active ray list are traced against that object point in step 350. If there is a trace hit, the hit is recorded in step 360. Whether there was a hit or not, if the object point is a farthest point for that object (e.g., E max), that object is removed from the active object list in step 365, i.e., both the closest and farthest points for that object are removed from the active object list. If there was a hit, in step 370, a determination of whether the object hit was an object exit point is made and if so, the ray is removed from the active ray list. For example, any rays that have hit that object (e.g., at the object min point) will be removed from the active ray list in step 370 as there will be no other objects (e.g., objects within another object's bounding box, such as object F within object C) which could create a ray trace hit. Step 330 is repeated; each ordered list is stepped through in this manner until all rays and objects have been added to an active list and processed. Each trace hit is recorded; this may result in additional rays (e.g., reflections) or tertiary rays depending on the shader code that may execute at that point. These additional rays may also be collected and processed as per FIG. 3.

Figure 5:
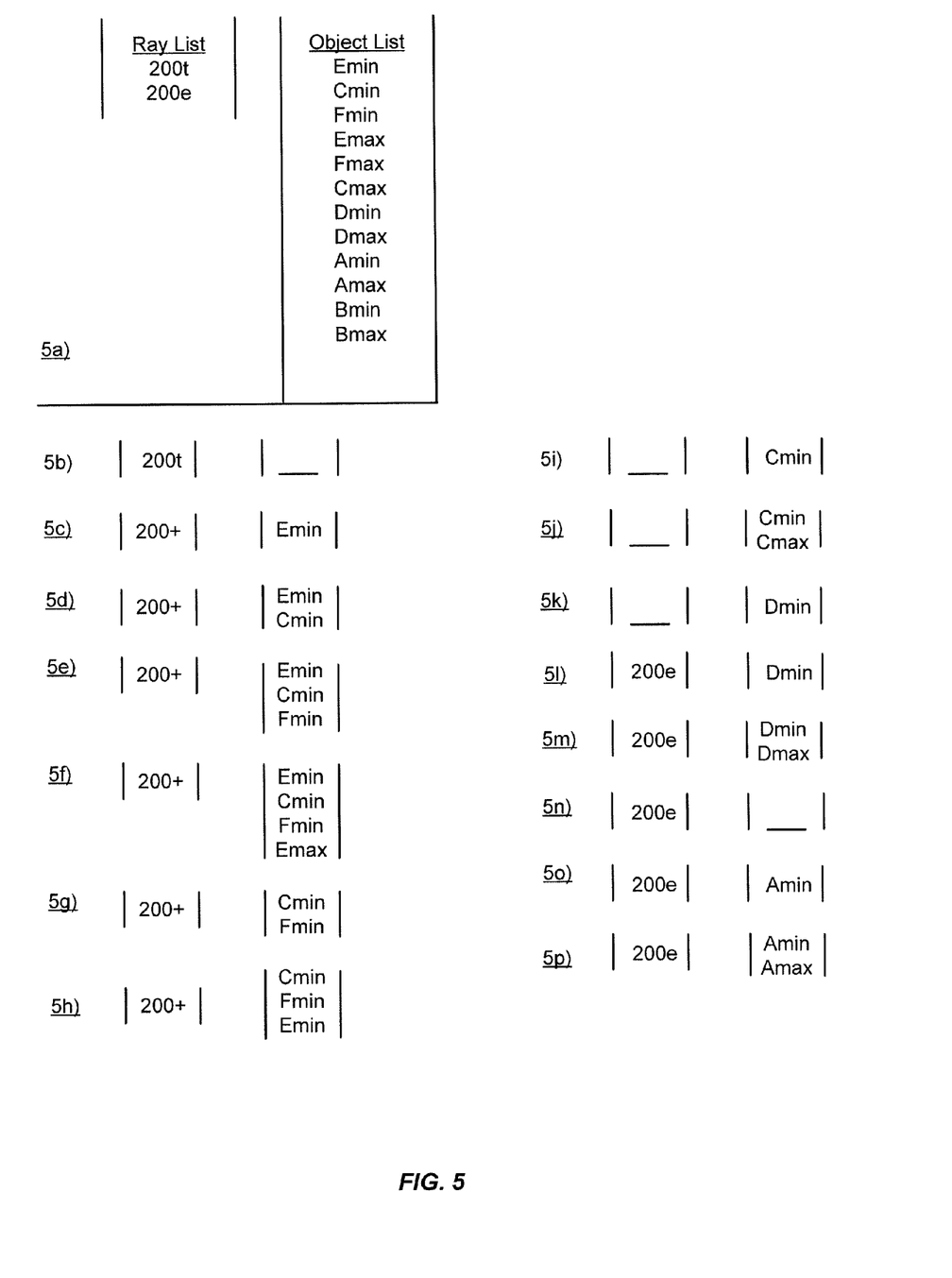

As one example, consider a simplified ray set including only secondary rays 200t and 200e, and an object set including objects A, B, C, D, E, and F as shown in FIG. 2a. In this case, the ray list will include the origins for ray 200t and for 200e, sorted in that order for the +x primary direction as shown in FIG. 5a, and the object list will look like (E min, C min, F min, E max, F max, C max, D min, D max, A min, A max, B min, B max). Thus, in step 330, the first ray 200t is compared with the first object point, E min. The point corresponding to the origin of 200t along the +x direction is less than E min, so it is added to the active ray list in step 335 (and removed from consideration from the ordered ray list) and is traced against any objects on the active object list in step 345. Initially, the active object list is empty, so no tracing occurs (see FIG. 5b). Next, step 330 repeats and the first ray in the ray list, now 200e, is compared with the first object in the object list, still E min. E min is less than the origin of 200t, so E min is added to the active object list in step 340 and all active rays are then traced against E min in step 350 (E min is also removed from consideration from the sorted object list, and not considered further). In this case, the only active ray on the active ray list is 200t, which when traced against E min, produces no hit. FIG. 5c shows the active lists at this time. AS E min is not an exit point for object E, E min remains on the active object list and step 330 repeats.

Now, ray 200e is compared with the first entry on the object list, which is C min. C min is less than the origin of 200e, so C min is added to the active object list and all active rays are then traced against C min (C min is also removed from consideration from the sorted object list). In this case, the only active ray on the active ray list is 200t, which when traced against C min, produces a hit. This hit is recorded. Ray 200e is kept on the active ray list as this was a hit with an entry point, e.g., E min, for the bounding box of object C. FIG. 5d shows the active lists at this time.

Next, ray 200e is compared with the first entry on the object list, which is now F min. F min is less than the origin of 200e, so F min is added to the active object list and all active rays are then traced against F min (F min is also removed from consideration from the sorted object list, and not considered further). In this case, the only active ray on the active ray list is 200t, which when traced against F min, produces a hit. This hit is recorded. Ray 200e is kept on the active ray list as this was a hit with an entry point, e.g., F min, for the bounding box of object F. FIG. 5e shows the active lists at this time.

Next, ray 200e is compared with the first entry on the object list, which is now E max. E max is less than the origin of 200e, so E max is added to the active object list (FIG. 5f shows the active lists at this time.) and all active rays are then traced against E max (E max is also removed from consideration from the sorted object list). In this case, the only active ray on the active ray list is 200t, which when traced against E max, produces no hit and ray 200e is kept on the active ray list. As this was an object exit point, e.g., for the bounding box of object E, object E is taken off the active object list (both E min and E max are removed) in step 375. Only C min and F min remain on the active object list, and only 200t on the active ray list. FIG. 5g shows the active lists at this time.

Next, ray 200e is compared with the first entry on the object list, which is now F max. F max is less than the origin of 200e, so F max is added to the active object list (FIG. 5h shows the active lists at this time) and all active rays are then traced against F max (F max is also removed from the sorted object list, and not considered further). In this case, the only active ray on the active ray list is 200t, which when traced against F max, produces a hit. This hit is recorded. Ray 200t is removed from the active ray list as this was a hit with an exit point, e.g., F max, for the bounding box of object F. Object F is also taken off of the active object list (both F min and F max are removed). Only C min remains on the active object list at this time; no active rays are on the active ray list. FIG. 5i shows the active lists at this time.

Next, ray 200e is compared with the first entry on the object list, which is now C max. C max is less than the origin of 200e, so C max is added to the active object list (FIG. 5j shows the active lists at this time.) and all active rays are then traced against C max (C max is also effectively removed from the sorted object list, and not considered further). In this case, there are no active rays on the active ray list. As this was an object exit point, e.g., for the bounding box of object C, object C is taken off the active object list (both C min and C max are removed). At this time, there are no object points on the active object list, and no rays on the active ray list.

Next, ray 200e is compared with the first entry on the object list, which is now D min. D min is less than the origin of 200e, so D min is added to the active object list (FIG. 5k shows the active lists at this time.) and all active rays are then traced against D min (D min is also effectively removed from the sorted object list, and not considered further). In this case, there are no active rays on the active ray list so no trace is done.

Next, ray 200e is compared with the first entry on the object list, which is now D max. The point corresponding to the origin of 200e along the +x direction is less than D max, so it is added to the active ray list and is traced against any objects on the active object list. FIG. 5l shows the active lists at this time. The active object list includes only D min and a trace of ray 200e on D min does not produce a hit.

Next, as the ordered ray list is now empty, the next object point from the sorted object list, D max, is added to the active object list (FIG. 5m shows the active lists at this time) and a trace of 200e against that point is done. No hit occurs. As D max was an object exit point, e.g., for the bounding box of object D, object D is taken off the active object list (both D min and D max are removed). At this time, there are no object points on the active object list, and only ray 200e on the active ray list as shown in FIG. 5n.

The next object point from the sorted object list, A min, is added to the active object list (FIG. 5o shows the active lists at this time) and a trace of 200e against that point is done. Here a hit occurs and is recorded. A min is an object entry point, so it remains on the active object list as does ray 200e remain on the active ray list. The next object point from the sorted object list, A max, is added to the active object list (FIG. 5p shows the active lists at this time) and a trace of 200e against that point is done. This hit is recorded. Ray 200e is removed from the active ray list as this was a hit with an exit point, e.g., A max, for the bounding box of object A. Object A is also taken off of the active object list (both A min and A max are removed). The process concludes for this frame as there are no more objects or rays in the sorted lists.

Figure 6:
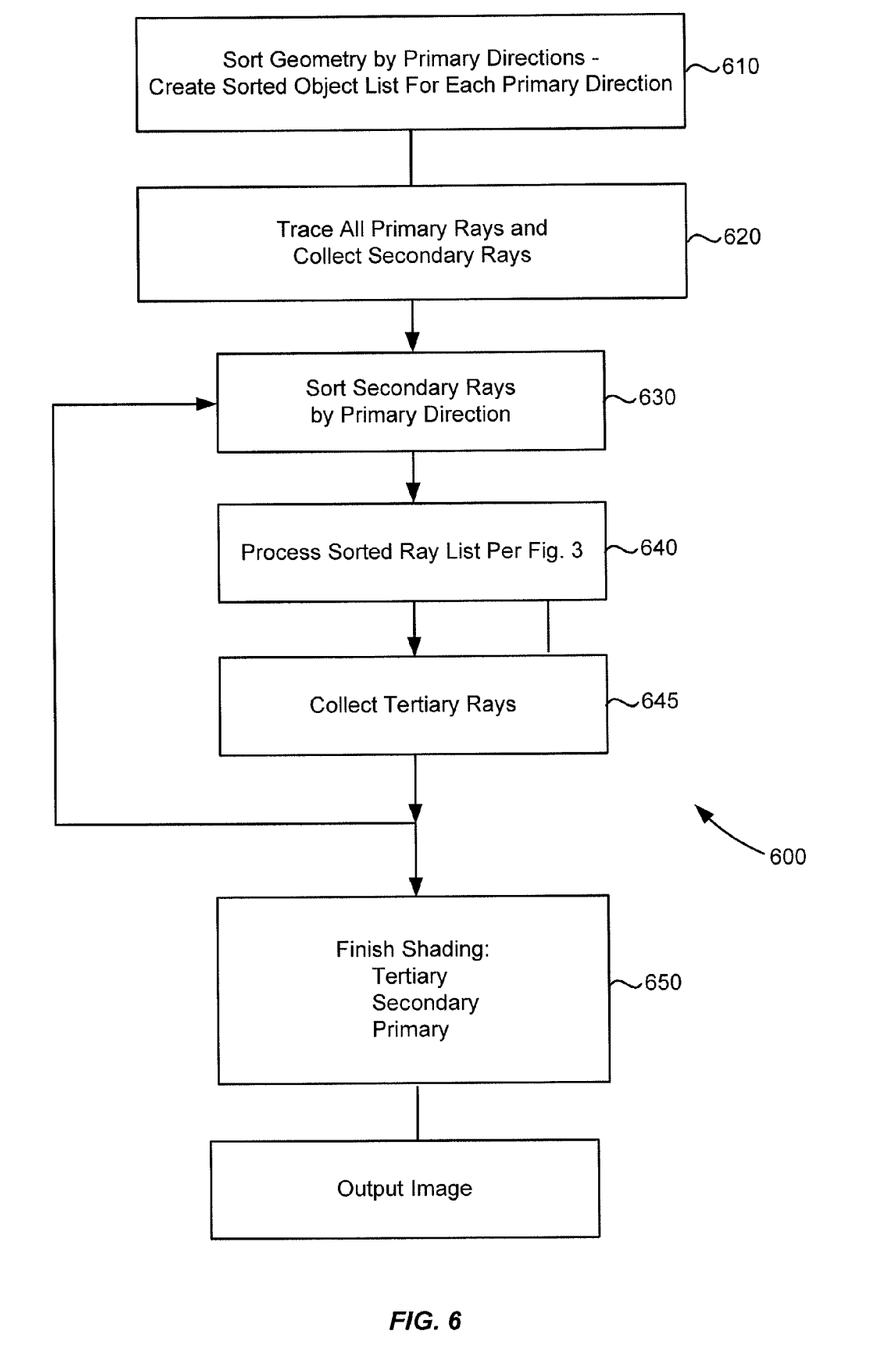
FIG. 6 is a flow chart for a computerized ray tracing method for an image including a plurality of rays and a plurality of objects.

FIG. 6 illustrates a rendering method 600 according to one embodiment. In step 610, an image is loaded or accessed and geometry for that image is sorted by principal/primary directions to create a sorted object list for each primary direction. In step 620, a set of primary rays are traced against the geometry and secondary rays are collected as is well known. In step 630, for each primary direction, the secondary rays are sorted to create a sorted ray list for that primary direction. In step 640, the process described above with reference to FIG. 3 is executed for each primary direction. Tertiary rays are collected in step 645. Steps 630, 640 and 645 may be repeated using the collected tertiary rays instead of secondary rays, and again as many times as desired.

In step 650, shading is completed starting with the lowest level rays, e.g., tertiary rays, then secondary rays, then primary rays, to render the image. The process 600 may repeat for each image to be rendered.

It is to be understood that the examples and embodiments described above are for illustrative purposes only and that various modifications or changes in light thereof will be suggested to persons skilled in the art and are to be included within the spirit and purview of this application and scope of the appended claims. For example, if a ray is a "shadow ray", for any hit, the ray may be removed from the ray list as the ray does not need to be tested again as to whether the ray in combination with an object causes another ray to be in shadow. Therefore, the above description should not be understood as limiting the scope of the invention as defined by the claims.

What is claimed is:

1. A computer implemented ray tracing method for use in rendering an image of a scene that includes a plurality of objects, the method comprises:
   for each of at least a first object and a second object, determining a lower bound along a primary direction;
   ordering the objects based on their lower bounds to form an ordered object list;
   determining an origin for each of a plurality of rays along the primary direction;
   ordering the rays based on their origins to form an ordered ray list;
   performing a ray tracing operation based on the order of the rays and objects in the ordered object list and the ordered ray list; and
   rendering the image using the results of the ray tracing operation;
   wherein performing a ray tracing operation includes:
   comparing the first entry in the ordered object list with the first entry in the ordered ray list;
   if the origin of the first entry in the ordered ray list is less than the lower bound of the first entry in the ordered object list, then adding the ray corresponding to the first entry in the ordered ray list to an active ray list, and tracing that ray against objects in an active object list; and
   if the origin of the first entry in the ordered ray list is greater than the lower bound of the first entry in the ordered object list, then adding the object corresponding to the first entry in the ordered object list to an active object list, and tracing rays in the active ray list against that object.

2. The method of claim 1, wherein the rays are vectors and wherein determining coordinate values for the rays includes taking the dot product of the ray vectors with a unit vector along the primary direction.

3. The method of claim 1, wherein determining a lower bound for the objects includes forming a bounding structure around each object and determining the minimum values of each bounding structure along the primary direction.

4. The method of claim 3, wherein a bounding structure includes a structure having at least one face that is perpendicular to the primary direction.

5. The method of claim 1, further comprising repeating the steps for each of a plurality of primary directions in a coordinate system.

6. The method of claim 5, wherein the coordinate system is an orthogonal coordinate system.

7. The method of claim 5, wherein the coordinate system is a tetrahedral coordinate system.

8. The method of claim 7, wherein the primary directions are orthogonal to the surfaces of a tetrahedron.

9. The method of claim 1, wherein the primary directions includes one or more of a +x primary direction, a −x primary direction, a +y primary direction, a −y primary direction, a +z primary direction, or a −z primary direction.

10. The method of claim 1, wherein the rays are secondary rays.

11. The method of claim 1, further including recording any trace hits.

12. The method of claim 1, further including:
   for the first object and second object, determining an upper bound along the primary direction; and wherein performing a ray tracing operation includes:
   a) comparing the first ray in the ordered object list with the first object in the ordered ray list, and
   b) if the origin of the ray is less than the lower bound of the object, then:
   removing the ray from the ordered ray list,
   adding the ray to an active ray list,
   removing from the active object list objects with upper bounds less than the origin of the ray, and
   tracing the ray against objects in the active object list;
   c) if the origin of the ray is greater than the lower bound of the object, then:
   removing the object from the ordered object list,
   adding the object to an active object list,
   removing from the active ray list rays that have intersected an opaque object at a location less than the lower bound of the object, and
   tracing rays in the active ray list against the object.

13. The method of claim 12, further including repeating steps a), b), and c) until all rays in the ordered ray list and all objects in the ordered object list have been processed.

14. A non-transitory computer readable medium storing code, which when executed by a processor, causes the processor to:
   determine a lower bound along a primary direction for each of a plurality of objects for an image to be rendered;
   order the objects based on their lower bounds to form an ordered object list;

determine an origin for each of a plurality of rays along the primary direction;

order the rays based on their origins to form an ordered ray list;

perform a ray tracing operation based on the order of the rays and objects in the ordered object list and the ordered ray list; and render the image using the results of the ray tracing operation;

wherein performing a ray tracing operation includes:

comparing the first entry in the ordered object list with the first entry in the ordered ray list;

if the origin of the first entry in the ordered ray list is less than the lower bound of the first entry in the ordered object list, then adding the ray corresponding to the first entry in the ordered ray list to an active ray list, and tracing that ray against objects in an active object list; and if the origin of the first entry in the ordered ray list is greater than the lower bound of the first entry in the ordered object list, then adding the object corresponding to the first entry in the ordered object list to an active object list, and tracing rays in the active ray list against that object.

15. The non-transitory computer readable medium of claim 14, further including code to determine, for the first object and second object, an upper bound along the primary direction; and wherein the code to perform a ray tracing operation includes code to:

a) compare the first ray in the ordered object list with the first object in the ordered ray list, and b) if the origin of the ray is less than the lower bound of the object, then:
 remove the ray from the ordered ray list,
 add the ray to an active ray list,
 remove from the active object list objects with upper bounds less than the origin of the ray, and
 trace the ray against objects in the active object list;

c) if the origin of the ray is greater than the lower bound of the object, then:
 remove the object from the ordered object list,
 add the object to an active object list,
 remove from the active ray list rays that have intersected an opaque object at a location less than the lower bound of the object, and
 trace rays in the active ray list against the object.

16. The non-transitory computer readable medium of claim 15, wherein the code to perform a ray tracing operation includes code to repeat a), b), and
 c) until all rays in the ordered ray list and all objects in the ordered object list have been processed.

17. The non-transitory computer readable medium of claim 15, further including code to record any ray trace hits.

18. The non-transitory computer readable medium of claim 14, wherein the code to determine lower bounds for the objects includes code to form a bounding structure around each object and to determine a minimum value of each bounding structure along the primary direction.

19. A non-transitory computer-readable medium storing computer-executable code ray tracing a scene that includes a plurality of objects, the non-transitory computer-readable medium comprising:

code for generating an ordered object list ordering each object in the object list based on one or more aspects of the object along a primary direction;

code for generating an ordered ray list ordering each ray in the ray list based on based on the origin of the ray along the primary direction;

code for comparing the first entry in the ordered object list with the first entry in the ordered ray list;

code for generating information configuring the ray corresponding to the first entry in the ordered ray list to be traced against objects in an active object list if the origin of the first entry in the ordered ray list is less than a first portion of a boundary of the first entry in the ordered object list along the primary direction in response to adding that ray to an active ray list; and code for generating information configuring rays in an active ray list to be traced against an object corresponding to the first entry in the ordered object list if the origin of the first entry in the ordered ray list is greater than the first portion of the boundary of the first entry in the ordered object list along the primary direction in response to adding that object to an active object list.

* * * * *